United States Patent
Alban et al.

(10) Patent No.: US 8,409,329 B2
(45) Date of Patent: Apr. 2, 2013

(54) METHOD FOR THE PURIFICATION OF A GAS CONTAINING $CO_2$ USING AN ADSORPTION PURIFICATION UNIT

(75) Inventors: Bruno Alban, Massy (FR); Christophe Claeys, Limours (FR); Philippe Court, Paris (FR); Arthur Darde, Paris (FR); Guillaume De Smedt, Antony (FR); Bao Ha, San Ramon, CA (US); Vladimir Hasanov, Rueil-Malmaison (FR); Simon Jallais, Chaville (FR); Christian Monereau, Paris (FR); Serge Moreau, Velizy Villacoublay (FR); Elise Renou, Chaville (FR); Ivan Sanchez-Molinero, Versailles (FR); Jean-Pierre Tranier, L'Hay-les-Roses (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 485 days.

(21) Appl. No.: 12/668,694

(22) PCT Filed: Jul. 8, 2008

(86) PCT No.: PCT/FR2008/051274
§ 371 (c)(1),
(2), (4) Date: Apr. 23, 2010

(87) PCT Pub. No.: WO2009/010691
PCT Pub. Date: Jan. 22, 2009

(65) Prior Publication Data
US 2010/0206165 A1  Aug. 19, 2010

(30) Foreign Application Priority Data

Jul. 13, 2007 (FR) .................................. 07 56942

(51) Int. Cl.
*B01D 53/02* (2006.01)
(52) U.S. Cl. .............. 95/96; 95/129; 95/131; 95/132; 95/133; 95/134; 95/136; 95/137; 95/106; 95/149
(58) Field of Classification Search .............. 95/96, 129, 95/131, 132, 133, 134, 136, 137, 106, 149
See application file for complete search history.

(56) References Cited

U.S. PATENT DOCUMENTS 5,233,837 A    8/1993  Callahan
2007/0031302 A1*  2/2007  Wittrup et al. ............... 422/168

FOREIGN PATENT DOCUMENTS

| EP | 0469781 | 2/1992 |
| EP | 0503910 | 9/1992 |
| EP | 1308198 | 5/2003 |
| EP | 1332786 | 8/2003 |
| GB | 2174379 | 11/1986 |
| JP | 06099034 | 4/1994 |

OTHER PUBLICATIONS

Search Report for PCT/FR2008/051274.

* cited by examiner

*Primary Examiner* — Robert A Hopkins
(74) *Attorney, Agent, or Firm* — Elwood L. Haynes

(57) ABSTRACT

A method for the purification of a feed gas stream containing $CO_2$ and water and at least one impurity chosen from NOx and SOx, comprising the incorporation of a purification step for the preferential elimination of water is provided.

31 Claims, 1 Drawing Sheet

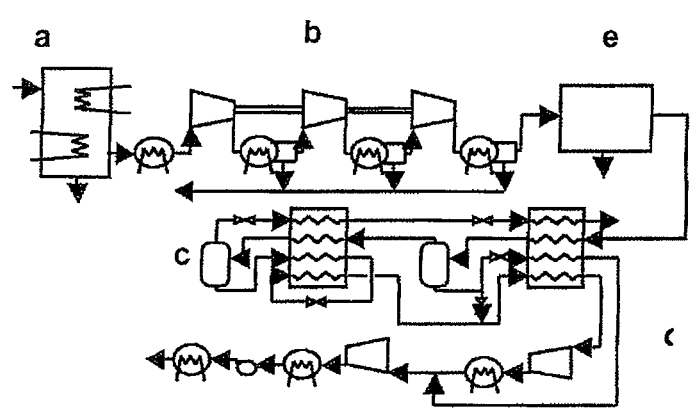

METHOD FOR THE PURIFICATION OF A GAS CONTAINING $CO_2$ USING AN ADSORPTION PURIFICATION UNIT

This application is a §371 of International PCT Application PCT/FR2008/051274, filed Jul. 8, 2008.

FIELD OF THE INVENTION

The invention relates to a method for the purification of a feed gas stream containing $CO_2$ and water and at least one impurity chosen from NOx and SOx, characterized by the incorporation of a purification step for the preferential elimination of water.

BACKGROUND

It consists more precisely of the development of a complete method for treating $CO_2$ coming from oxycombustion (combustion with pure oxygen or with a gas leaner in nitrogen than air is) of an industrial nature, enabling it to be packaged for transport and storage for various uses.

In point of fact, gases from the combustion of fossil fuels and/or biomass or from waste incineration or gases from glass furnaces mainly contain heavy metals such as mercury, arsenic, iron, nickel etc, organic contaminants and compounds of the SOx or NOx type.

Solutions exist for treating contaminants at atmospheric pressure for which atmospheric discharges are regulated ($SO_2$, NOx, Hg and CO for example).

For example, document EP-A-1 332 786 describes a method for the purification of a gas stream by eliminating NOx, SOx, Hg, and HgO by oxidation with ozone.

In addition, it is known from document EP-A-1 308 198 to eliminate mercury by gas-liquid contact in the presence of $H_2S$. Flash distillation of the liquid phase provides a gas rich in mercury that is trapped by adsorption on $Al_2O_3$, $TiO_2$, $SiO_2$, active carbon or zeolite, doped with sulfur-containing compounds.

However, these methods do not guarantee complete elimination of the contaminants treated but aim at a limited content discharged to atmosphere, such as required by the specifications in place.

In addition, they treat fumes from combustion with air, which are less concentrated since they mainly contain nitrogen. In point of fact, if the stoichiometry of combustion reactions is considered, the quantity of oxygen (oxidant) to be provided is determined by the quantity of fuel. Therefore, if air is used and not pure oxygen, given that there is only 21% oxygen in this air, it is necessary to enter a much higher flow in order to guarantee an identical concentration of oxygen so as to carry out this combustion under correct conditions. Thus, the streams are more dilute and nitrogen is therefore found in a large quantity in the fumes since it is the main component of air (~78%).

However, the application for capturing and storing $CO_2$ coming from oxycombustion creates supplementary requirements for purification from other compounds and/or these same compounds in different proportions.

In point of fact, this application for capturing and storing $CO_2$ coming from oxycombustion requires not only treatment to remove large quantities of compounds that are not in the majority, but also a thorough purification treatment ("polishing") for the product that aims at eliminating impurities that are prejudicial to all the method as well as to the storage of this $CO_2$ in suitable geological strata.

In particular, water must be stopped to concentration such that its presence does not present a blocking problem, either in the case of low temperature treatment <0° C. or during transport or storage of $CO_2$.

Starting from this, a problem presented is to provide an improved method for the purification of a gas stream containing $CO_2$, namely a method guaranteeing intensive elimination of the contaminants treated, in particular intensive elimination of water.

SUMMARY OF THE INVENTION

The invention's solution is therefore a method for the purification of a feed gas stream containing $CO_2$, and at least one impurity chosen from water, SOx and NOx, comprising the following successive steps:

a) a step of pretreating the feed gas stream aimed at eliminating, at least partially, one of the impurities chosen from nitrogen, oxygen, argon, the rare gases, SOx, $CS_2$, $H_2S$, NOx, HCN, HCl, $CHCl_3$, HF, volatile organic compounds and the following metals: mercury, arsenic, selenium, cadmium, iron and nickel and compounds derived from these metals;

b) a step of compressing the preheated gas stream to a pressure of between 10 and 50 bar;

c) a step of recovering a purified $CO_2$-rich gas stream, in the liquid, gaseous or supercritical state; characterized in that a purification step is carried out between steps a) and c) in which use is made of at least one bed of adsorbents that are neutral to NOx and/or SOx and have adsorption properties enabling water to be eliminated, at least partially, in the presence of NOx and/or SOx.

Adsorption properties are understood to refer to an adsorbent enabling a constituent to be preferentially eliminated, the adsorbent having an adsorption capacity at equilibrium and adsorption kinetics so that it is possible to remove the essential part of a constituent from a gas stream and on account of this to purify, at least partially, said gas stream of this constituent.

Thus, drying a $CO_2$ stream could from this point of view be carried out on activated alumina, active carbon, silica gel, on the vast majority of industrial zeolites of the A, X, Y type etc, and on CMSs (Carbon Molecular Sieves).

An adsorbent neutral to NOx and SOx is understood to mean an adsorbent resistant to acids derived from NOx and/or SOx or that does not adsorb NOx and/or SOx.

An adsorbent that does not adsorb NOx and/or SOx is understood to mean an adsorbent of which the pore diameter is such that it does not allow diffusion of said molecules to the active sites of the adsorbent, that is to say taking into account the characteristics of the molecules in question, having pores with a diameter less than 0.4 nm. Taking into account the fact that these adsorbents should have adsorption properties for water, the diameter of these pores should also be greater than 0.28 nm.

Generally, efficient adsorbents consist of an active material possessing very high internal porosity, generally greater than 50 $m^2/g$ and often even greater than 200 $m^2/g$. Access of adsorbable molecules to this porosity is possible by virtue of the porous structure that should be sufficiently large to permit the molecules to penetrate. In order to prevent molecules from being adsorbed, it is then sufficient to have a sufficiently closed porous structure so that said molecules cannot penetrate there. Thus, zeolite of the 3A type with a pore opening of approximately 3Å only accepts in practice water molecules that are adsorbed there very strongly. Other methods are also possible, such as chemical deposition of a surface layer with a vue to reducing the opening of the porosity without notably modifying the total volume thereof.

A determination of the minimum pore size for preventing molecules from penetrating into the porosity depends notably on its shape. Thus the kinetic diameter of the molecule is not always the best criterion, since on being adsorbed, the molecule may be oriented relative to the pores, for example in length, and in this case it will pass better than its critical diameter would lead one to suppose, or indeed in width and this will then be the contrary case. The orientation will depend on forces responsible for adsorption, which will depend on the molecular properties such as polarity, polarizablity, molecular weight.

One of the means for testing the accessibility or lack thereof of the molecule to active sites of an adsorbent is to proceed experimentally.

Many methods exist that are described in works or articles relating to this subject. For example, a test may be selected of the breakthrough curve type that is easy to put into practice and interpret.

The adsorbent is placed in a column having a length to diameter ratio of between 10 and 15, and a diameter 10 to 20 times the size of the particle if these are not beads, or the mean diameter in the latter case. Filling is carried out in the form of spray, in order to obtain a maximum reproducible density.

Manipulation is reproduced with an identical column filled with a non-porous inert material and therefore one that is by nature non-adsorbent, with the same particle size, as for example glass, non-porous ceramic, etc. An inert material is thus understood to be a material that does not adsorb the impurity that is being studied, typically non-porous glass beads.

A mixture consisting of helium containing 1% by volume of the gaseous compound to be studied is passed upward. The temperature is 20° C. and the total pressure is 1 bar abs. The concentration of the gaseous compound is measured at the outlet as a function of time, which is known as the breakthrough curve.

The column filled with the inert material is used as a starting point. The gas flow is adapted so that the breakthrough front at 50% of the initial concentration is of the order of a minute.

The breakthrough curve is measured under the same conditions with the adsorbent concerned. The adsorbent is considered to be non-adsorbent if the corresponding time at the outlet with a 50% concentration at the inlet is less than 1.5 times that obtained with the inert material.

Adsorbents resistant to acids are such that a chemical reaction with the structure is not possible. A structure is understood to mean a continuous solid matrix of which the material is made. In the case of adsorbents, this matrix is porous and it is in these pores or on their surface that adsorption is made.

For example, the majority of zeolites, that are aluminosilicates, and activated aluminas are not resistant to acids, since aluminum forms stable salts, for example aluminum nitrate:

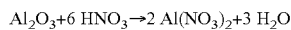

Silica gel is resistant to acids, since silica is a compound that is itself acidic and forms silicates, for example of sodium:

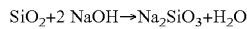

but never silicon salts.

The reaction of silica with hydrogen fluoride does not form a salt in the proper sense, since the compound obtained $SiF_4$ is not ionic as proved by its molecular form encountered in the solid form and its high volatility.

In a general manner, we are only interested in Brösntedt acidity, where an acid is a compound that is an $H^+$ donor and a base an $H^+$ receiver. Compounds obtained by these acid-base reactions form ionic crystals.

Some compounds are amphoteric, for example alumina, and may react with acids to form aluminum salts, and with bases to form aluminates. This is not the case with silica and other acid-resistant adsorbents.

In practice, the adsorbents that may be used are reduced to a few families:
  macro and microporous silica gels, possibly containing a few % of alumina,
  active carbons for non-oxidizing acids under the conditions of use, that is to say preferably unconcentrated and/or at low temperature;
  decationized zeolites with a high Si/Al ratio such as mordenite, chabazite, clinoptilolite, ferrierite, offrerite, USY etc. These zeolites may have undergone a supplementary de-alumination treatment to bring the Si/Al ratio to above 5, preferably above 20 or even above 50;
  porous glasses;
  activated clays with a high Si/Al ratio.

According to each case, the method according to the invention may have one of the following features:
  after step c), the gas stream is in the liquid state and stored, or in the supercritical state and transported and/or stored, or in the gaseous state and transported;
  the adsorbents neutral to NOx and/or SOx are resistant to acids derived from NOx and/or SOx or do not adsorb NOx and/or SOx;
  the bed of adsorbents neutral to NOx and/or SOx consists of silica gel, porous glass or zeolite with an Si/Al ratio $\geqq 5$ and/or zeolite 3A;
  the zeolite is chosen from mordenite, chabazite, clinoptilolite, ferrierite, offrerite or USY, these zeolites being partially de-aluminated or not;
  the zeolite is characterized by an Si/Al ratio $\geqq 20$, preferably $\geqq 50$;
  in the purification step, a second bed of adsorbents is employed with a greater efficiency for stopping water than the adsorbents of the first bed;
  the second bed of adsorbents consists of silica gel and/or of zeolite 3A;
  in the purification step, a third bed of adsorbents is employed consisting of zeolite 3A;
  in the purification step, three beds of adsorbents are employed with increasing efficiency for stopping water, preferably a first bed of porous glass or silica gel, a second bed of silica gel and a third bed of zeolite 3A;
  in the purification step, a first bed of adsorbents is employed resistant to acids derived from NOx and/or SOx so as to eliminate, at least partially, said $NO_x$ and/or $SO_x$ and, at least partially, water;
  the first bed of adsorbents resistant to acids derived from NOx and/or SOx is followed by a bed of adsorbents chosen from activated aluminas, impregnated activated aluminas, zeolites A or X, for eliminating water, at least partially;
  in the purification step, use is made downstream of the first bed of adsorbents of a bed of adsorbents for the preferential elimination of compounds derived from mercury, arsenic, selenium, cadmium, iron and nickel;
  between steps b) and c), a step is carried out for eliminating at least partially at a temperature <5° C. at least one impurity, present in the compressed gas stream, chosen from nitrogen, oxygen, argon and the rare gases with the aid of exchangers combined with separators;

the purification step is carried out between step a) and step b);

the purification step is carried out after step b);

the compression step b) comprises successive compression phases and the purification step is carried out between two successive compression phases of said compression step b);

the purification step is carried out at a pressure of ≦20 bar, preferably ≦10 bar, and even more preferably ≦6 bar, and the compression phases downstream of the purification step are carried out in compressors made of carbon steel;

the purification unit employed in the purification step is of the TSA or VSA or PSA type, or a combination, preferably of the TSA type;

after the purification step, porous glass or silica gel employed in the first bed is regenerated by washing with water or with steam followed by heating while being swept with gas at a temperature of between 80 and 200° C., preferably between 100 and 180° C.;

the feed gas stream corresponds to oxycombustion fumes;

the pre-treatment step comprises at least one of the following treatments: catalysis, filtration, washing and desulfuration, it being possible for washing to be coupled with cooling of the feed gas stream.

The effectiveness of an adsorbent to stop water is understood to mean its adsorption kinetics and/or its adsorption capacity for water. In practice, the adsorbent of a second bed will be said to be more effective than the adsorbent used in a first bed, if the fact of placing, in the second part of the adsorber, a second adsorbent different from that used in the first part of the adsorber enables separation to be improved, that is to say if the water breakthrough occurs subsequently under the same operating conditions.

"Oxycombustion" is understood to mean combustion in which carbon is burned in a nitrogen-lean fluid that may extend from pure oxygen (>95%) to a fluid containing the same quantity of oxygen as air (approximately 21%) obtained by mixing pure oxygen (>95%) with $CO_2$-rich recycled fumes.

Porous glass is a chemically inert material, very resistant in particular to bases and acids and having good physical properties (crushing, attrition). It is composed essentially of $SiO_2$, generally >90%, preferably >95%, and may contain a minor amount of $B_2O_3$, $Na_2O$, $Al_2O_3$, $ZrO_2$ and/or other metallic oxides.

This porous glass has the particular property, as its name indicates, of having a high amount of internal voids, generally greater than 25% by volume, in the form of pores of variable sizes according to the products, which enables internal areas to be developed of several hundreds of $m^2$ per gram.

As an example, mention may be made of VYCOR Brand Porous Glass 7930 from Corning Incorporated that has 28% porous volume, 250 $m^2$/gram internal area for a mean pore diameter of 40 A (4 nanometers).

Products of this type behave as adsorbents for water in particular and have similar isotherms to those that may be obtained with activated aluminas with generally condensation of the capillary type in the mesopores from a relative humidity of the order of 80%.

The invention will now be described in greater detail.

BRIEF DESCRIPTION OF THE FIGURES

FIG. 1 represents a device for carrying out a method

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein: according to the present invention, characterized by the location of the purification step at the end of the compression cycle, that is to say between steps (b) and (c).

The first step (a) of the present invention aims at treating the fumes by using known methods forming part of the state of the art. Washings currently exist that employ various liquids (or solvents) such as water, alcohols (methanol for example), solutions of amines, basic solutions etc, which are the most conventional, but there are many others, or desulfuration units, or filtration units.

The gas coming from step (a) may generally contain:

a large majority of $CO_2$ (generally greater than 80%);

nitrogen oxides, called $NO_x$, such as NO, $NO_2$, $N_2O_4$ etc;

sulfur oxides, called SOx, such as $SO_2$, $SO_3$, $H_2SO_4$ etc;

water at saturation (under the temperature and pressure conditions of the stream). In point of fact, almost all the treatment methods in the first step impose contacting the gas with an aqueous solution;

oxygen at a level of a few percent (coming from an excess relative to the stoichiometry necessary for ensuring correct oxycombustion efficiency);

CO (unburned in combustion);

non-condensables compared with $CO_2$: nitrogen, argon, oxygen and the rare gases coming mainly from air inputs to the oxycombustion furnace and of the purity of oxygen;

compounds derived from heavy metals: $AsCl_3$, AsO, $AsH_3$, AsN; $B(OH)_3$, $HBO_2$, $BH_3$; $BaCl_2$, BaO; $Be(OH)_2$; CdO, CdS, $CdSO_4$, $CdCl_2$; $CoCl_2$, CoO, $Co_2[(CO)_4]_2$; $CuCl_2$, CuCl, CuO, CuH; HgO, $HgCl_2$, $CH_3HgCl$, HgH, HgS, HgSe; MoO, $MoO_2$, $MoO_3$, $MoCP_2$, $Mo(CO)_6$; NiO, $NiCl_2$, $Ni(CO)_4$; $P_2O_5$, $PO_2$, $PCl_3$, $P_4O_6$; $PbCl_2$, PbO, PbS, PbCl; $Sb_2O_3$, SbCl, $SbH_3$, $H_3SbO_4$, $HSbO_3$; SeO, $SeO_2$, $SeO_3$, $H_2Se$, COSe; SnO, SnS, SnH; $SrCl_2$; $V_2O_5$, $V(CO)_4$; $ZnCl_2$, ZnS;

volatile organic compounds (VOC) and unburned hydrocarbons. The volatile organic compounds are preferably chosen from formaldehyde, acetaldehyde, formic acid, acrolein and acetic acid.

Then, during the second step (b), the gas stream is compressed to a sufficient pressure level so as to be able, on the one hand, to separate part of the undesirable compounds making up this (separators generally situated immediately after each compression step followed by heat exchange to cool the gas stream in order to eliminate condensables appearing during cooling: water for example) and, on the other hand, in order to bring the gas under the correct conditions (of temperature and pressure) so as to prepare for the elimination of other impurities during the following steps.

A possible penultimate step will be the elimination of non-condensables. It is known that this third step may be optimized if it is carried out at a low temperature, namely at a temperature <5° C., preferably at a negative temperature, even more preferably between −20°C. and −60° C. with the aid of exchangers combined with separators in a cold cycle.

The fourth step (c) aims at recovering a $CO_2$-rich purified gas stream.

Thus, water present in the gas stream should be stopped until a concentration is reached such that its presence does not present a blocking problem, either in the case of a low temperature treatment <0° C. (the case for example of any penultimate step) or during transport or storage of $CO_2$.

This water content may be less than one ppm but also may very well reach a few ppm according to the treatment, transport and storage conditions.

NOx and SOx present in the gas to be treated may or may not be acceptable according, on the one hand, to their content and, on the other hand, to standards concerning the $CO_2$ produced or methods envisaged for treating $CO_2$.

However, even if NOx and SOx are acceptable, they may be adsorbed and/or dissolved in the aqueous phase during the purification step and consequently bring about a deterioration of the adsorbents.

Thus, it appears that the purification step by means of adsorbents neutral to SOx and NOx is indispensable.

This purification step may be placed all along the second step b) that aims progressively to compress gases around atmospheric pressure to the pressure required for separating inerts.

Consequently, the choice of the location of the purification step will be a function of a certain number of criteria such as investment, the type of materials in the second step b) and the nature and concentration of the impurities etc.

The first possibility is to place the purification step at the start of step b), that is to say to carry out purification at low pressure.

However, this position brings about disadvantages, namely:
- on the one hand, purification that is not optimal since the lower the operating pressure the smaller the quantity of impurities fixed, and
- on the other hand, the non-use of liquid/gas separation that will be systematically positioned behind each compression stage making up the compression line ($2^{nd}$ step b). In point of fact, these separations may make it possible to recover a considerable quantity of condensable molecules that have been condensed during compression, such as for example the remaining water and volatile organic compounds. Consequently, the quantity of impurities to be eliminated following step b) will be much smaller. It will inevitably result in considerable advantages in terms of investment on this purification step.

On the other hand, the position of the purification step upstream of the compressor line constituting the second step b) makes it possible to envisage removing impurities prejudicial to the remainder of the method: that is to say water and possibly NOx, volatile organic compounds, metal-based compounds etc and it may also result in some advantage as regards the nature of the materials to be subsequently used, in particular in the compression steps.

In point of fact, the combustion fumes are loaded with $CO_2$ and other acidic gases and are certainly moist.

This involves the use of stainless steel for all the metallic material in contact with these gases.

This is notably the case when these fumes are compressed. The extra cost for a compressor is very high.

Thus, the present invention proposes for example to dry gas at the start of compression, that is at a pressure of approximately 4 bar, and to carry out drying downstream with carbon steel compressors.

Moreover, a low pressure $\leqq 6$ bar may lead advantageously to the employment of radial beds capable of treating large flow rates of gas for drying instead of horizontal beds.

The second possibility is to place the purification step between two compression stages of the second step b).

This second possibility makes it possible in point of fact to have available a gas at an intermediate pressure between that close to atmospheric (start of the second step b)) and the maximum required in the third step of the method. The result is inevitably a large reduction of the volume installed and therefore in the cost of the unit.

This is all the more true if the purification step is moved toward the end of the second step. In point of fact, water risks becoming the key element for dimensioning the purification unit employed in the purification step (in the case of cyclic adsorption for example). On the one hand, all the compression steps upstream of the purification step enable a considerable part of the water contained in the starting gas to be liquefied. On the other hand, a pressure increase is accompanied by a reduction in the volume installed for purifying the gas.

On the other hand, the main disadvantage will come from the quantity of impurities that will be contained in the compression stages upstream of step c). It is therefore probable that compressors will have to be adapted to the types of impurities.

Finally, the third possibility is to place the purification step at the end of the second step b)

Thus, in this present case, the volume of the purification unit will be minimal but all of the second compression step b) will be carried out with the unpurified gas stream.

The choice of the location of the purification step will then be made taking into account the impurities (linked to a great extent to the raw material involved in oxycombustion, namely the nature of the coal), their possible impact on step 2 of the method (compression) and of the volume of the method to be installed.

Purification is carried out by adsorption. It will be noted that the choice of adsorbents is fundamental since a thorough polishing treatment is involved of the gas stream during step b) of the method according to the invention.

Now, many criteria then play a part in the choice of the succession of adsorbents to be used such as:
- the concentration of the molecules to be eliminated;
- the level of adsorption of various molecules: low for NO while it is high for $NO_2$ etc;
- the reactivity of various impurities, SOx and NOx, often has the tendency, in the presence of water, to be stabilized in the form of particularly strong acids such as $HNO_3$ and $H_2SO_4$;
- NOx are generally strongly adsorbed on carbonaceous matrices that may lead to explosive mixtures (concentrated fuel and oxidant within a porous lattice);
- metals or their derivatives are known to be correctly adsorbed on carbonaceous materials.

Moreover, in the case of the present invention, it is desired to eliminate water and as the case may be NOx and SOx without the chosen adsorbent undergoing a high degree of deterioration of the adsorption properties.

In point of fact, since acids and their derivatives are very polar, they will be dissolved in the aqueous phase, water, even allowing precursors to be converted into true acids.

In the case of acids called oxygenated acids, the additional presence of oxygen may also lead to oxidation of the acids present to their forms with a maximum degree of oxidation, that are generally the strongest.

It is well known that various species may react according to the following reactions:

$$SO_2 + \tfrac{1}{2}O_2 \longrightarrow SO_3$$

$$SO_3 + H_2O \longrightarrow H_2SO_4$$

$$SO_2 + H_2O \longrightarrow H_2SO_3$$

$$H_2SO_3 + \tfrac{1}{2}O_2 \longrightarrow H_2SO_4$$

$$2NO_2 + H_2O \longrightarrow HNO_2 + HNO_3$$

$$3NO_2 + H_2O \longrightarrow 2HNO_3 + NO$$

$$HNO_2 + \tfrac{1}{2}O_2 \longrightarrow HNO_3$$

$$HNO_3 + H_2SO_3 \longrightarrow H_2SO_4 + HNO_2$$

$$NO_2 + SO_2 \longleftrightarrow NO + SO_3$$

$$NO_2 + SO_2 + H_2O \longleftrightarrow H_2SO_4 + NO$$

These reactions are much slower as the compounds are diluted, particularly in the gaseous phase.

In the invention, we use the chemical reactivity of various components in order to eliminate them.

Nitric and sulfuric acid have sufficiently low vapor pressures to be adsorbed very effectively.

The ideal adsorbent must be able to adsorb all the undesirable constituents, notably water, to form an aqueous phase, and to withstand the oxidizing and acid conditions encountered. It must also be able to be regenerated easily and to adsorb little carbon dioxide.

Silica gel is to be found among ideal adsorbents within the context of the present invention. In point of fact, silica gel can adsorb up to 40% of its weight of water and can withstand acids and oxidants very well. It may be regenerated at a temperature of between 100 and 180° C., preferably between 125° C. and 150° C. Silica gel is produced by the polymerization of the monomer $Si(OH)_4$ obtained by neutralizing a sodium silicate with an acid, for example sulfuric acid, or by hydrolysis of a compound of the silicon alkoxide type such as $Si(EtO)_4$ so as to obtain a liquid aqueous phase called a silica sol that then gels. It is also possible to start with a commercial silica sol that is made to gel by modifying the pH or by adding an electrolyte. Two forms of silica gel exist, microporous and macroporous, which differ by the pore size and density. Their specific surface area lies between 200 m²/g and 850 m²/g. Silica gel consists of a hydroxylated porous silicaceous matrix (Si—OH) on the surface of the pores. Silica gels exist containing alumina that have the advantage of withstanding contact with liquid water (without fracturing). Silica gel adsorbs compounds by virtue of the hydrogen bonds that it forms with water. The very polar O—H bond of sulfuric and nitric acids is therefore very favorable to their being fixed by adsorption.

Regeneration of silica gel saturated with acids may be carried out by washing with water or steam followed by heating while being swept by a gas at approximately 150° C. Acids recovered in this way are in a concentrated state and therefore easier to treat.

Possibly, the very acid and oxidizing medium thus produced in the adsorbent may serve to eliminate other impurities, such as organic compounds of mercury or arsenic, by mineralizing them.

In the case where the gas stream contains only traces of acidic compounds that are to be eliminated to a very high level of purity in the gas, silica gel may be loaded with a compound such as sodium carbonate that will fix acids in the form of fixed ionic salts, according to the following reaction:

$$Na_2CO_3 + H_2SO_4 \longrightarrow Na_2SO_4 + CO_2 + H_2O$$

Other candidates capable of being used are porous glasses, some zeolites, possibly de-aluminated, having an Si/Al ratio above 5, preferably above 20 and even more preferably above 50.

The various beds employed in the purification step will be dimensioned so as to prevent the species aimed at being transmitted to the following adsorbent. Also, their dimensioning will depend on the quantity of the gas stream to be treated and on the impurity contents.

It may be of value to use an adsorbent resistant to NOx and SOx so as to eliminate them, possibly jointly with part of the water, so as to end drying with a conventional adsorbent not having particular resistance to NOx and/or SOx, for example activated impregnated aluminas, adsorbent zeolites conventionally used for the industrial drying of $CO_2$.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for the purification of a feed gas stream containing $CO_2$, water and at least one impurity chosen from SOx and NOx, comprising the following steps:
    a) pretreating the feed gas stream, at least partially eliminating one of the impurities selected from the group consisting of nitrogen, oxygen, argon, the rare gases, SOx, $CS_2$, $H_2S$, NOx, HCN, HCl, $CHCl_3$, HF, volatile organic compounds and the following metals: mercury, arsenic, selenium, cadmium, iron and nickel and compounds derived from these metals;
    b) compressing the preheated gas stream to a pressure of between 10 and 50 bar;
    c) recovering a purified $CO_2$-rich gas stream, in the liquid, gaseous or supercritical state;
    wherein a purification step is carried out between steps a) and b) utilizing at least one bed of adsorbents that are neutral to NOx and/or SOx and having adsorption properties enabling water to be at least partially eliminated in the presence of NOx and/or SOx.

2. The method of claim 1, wherein after step c) the gas stream is in either the liquid state or the supercritical state and is stored.

3. The method of claim 1, wherein after step c) the gas stream is in either the supercritical state or the gaseous state and is transported.

4. The method of claim 1, wherein the adsorbents neutral to NOx and/or SOx are resistant to acids derived from NOx and/or SOx.

5. The method of claim 1, wherein the adsorbents neutral to NOx and/or SOx do not adsorb NOx and/or SOx.

6. The method of claim 1, wherein the bed of adsorbents neutral to NOx and/or SOx consist of silica gel, porous glass or zeolite with an Si/Al ratio $\geq 5$ and/or zeolite 3A.

7. The method of claim 6, wherein the zeolite is selected from the group consisting of mordenite, chabazite, clinoptilolite, ferrierite, offrerite and USY, these zeolites being partially de-aluminated.

8. The method of claim 6, wherein the zeolite is selected from the group consisting of mordenite, chabazite, clinoptilolite, ferrierite, offrerite and USY, these zeolites not being partially de-aluminated.

9. The method of claim 6, wherein the zeolite has an Si/Al ratio $\geq 20$.

10. The method of claim 9, wherein the zeolite has an Si/Al ratio $\geq 50$.

11. The method of claim 1, wherein the purification step a second bed of adsorbents is employed with a greater efficiency for stopping water than the adsorbents of the first bed.

12. The method of claim 11, wherein the second bed of adsorbents consists of silica gel and/or of zeolite 3A.

13. The method of claim 1, wherein in the purification step a third bed of adsorbents is employed consisting of zeolite 3A.

14. The method of claim 1, wherein in the purification step three beds of adsorbents are employed with increasing efficiency for stopping water.

15. The method of claim 14, wherein in the purification step three beds of adsorbents comprise a first bed of porous glass or silica gel, a second bed of silica gel and a third bed of zeolite 3A.

16. The method of claim 1, wherein in the purification step a first bed of adsorbents is employed resistant to acids derived from NOx and/or SOx so as to at least partially eliminate said $NO_x$ and/or $SO_x$ and, at least partially, water.

17. The method as claimed in claim 16, wherein the first bed of adsorbents resistant to acids derived from NOx and/or SOx is followed by a bed of adsorbents for at least partially eliminating water, the adsorbent being selected from the group consisting of activated aluminas, impregnated activated aluminas, zeolite A and zeolite X.

18. The method of claim 1, wherein in the purification step use is made downstream of the first bed of adsorbents of a bed of adsorbents for the preferential elimination of compounds derived from mercury, arsenic, selenium, cadmium, iron and nickel.

19. The method of claim 1, wherein between steps b) and c) a step is carried out at a temperature <5° C., for at least partially eliminating of at least one impurity, present in the compressed gas stream with the aid of exchangers combined with separators, the impurity selected from the group consisting of nitrogen, oxygen, argon and the rare gases.

20. The method of claim 1, wherein the purification step is carried out after step b).

21. The method of claim 1, wherein the compression step b) comprises successive compression phases and the purification step is carried out between two successive compression phases of said compression step b).

22. The method of claim 1, wherein the purification step is carried out at a pressure of $\leqq 20$ bar, and in that the compression of step b) is carried out in a compressor or compressors made of carbon steel.

23. The method of claim 22, wherein the purification step is carried out at a pressure of $\leqq 10$ bar.

24. The method of claim 22, wherein the purification step is carried out at a pressure of $\leqq 6$ bar.

25. The method of claim 1, wherein the purification unit employed in the purification step is of the TSA or VSA or PSA type, or a combination.

26. The method of claim 25, wherein the purification unit employed in the purification step is of the TSA type.

27. The method of claim 1, wherein after the purification step porous glass or silica gel employed in the first bed is regenerated by washing with water or with steam followed by heating while being swept with gas at a temperature of between 80 and 200° C.

28. The method of claim 1, wherein the sweep gas has a temperature of between 100 and 180° C.

29. The method of claim 1, wherein the feed gas stream corresponds to oxycombustion fumes.

30. The method of claim 1, wherein the pre-treatment step comprises at least one treatment selected from the group consisting of catalysis, filtration, washing and desulfuration.

31. The method of claim 30, wherein the washing is coupled with cooling of the feed gas stream.

\* \* \* \* \*